US009707808B2

(12) United States Patent
White et al.

(10) Patent No.: US 9,707,808 B2
(45) Date of Patent: Jul. 18, 2017

(54) TIRE REMOVAL TOOL

(71) Applicants: Bosch Automotive Service Solutions LLC, Warren, MI (US); Robert Bosch GmbH, Stuttgart (DE)

(72) Inventors: Michael White, Montgomery City, MO (US); Larry Betcher, Northfield, MI (US); James Gwilt, Blooming Prairie, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 345 days.

(21) Appl. No.: 14/632,244

(22) Filed: Feb. 26, 2015

(65) Prior Publication Data

US 2015/0239311 A1 Aug. 27, 2015

Related U.S. Application Data

(60) Provisional application No. 61/944,803, filed on Feb. 26, 2014.

(51) Int. Cl.
*B60C 25/02* (2006.01)
*B60C 3/00* (2006.01)

(52) U.S. Cl.
CPC ........ *B60C 25/02* (2013.01); *B60C 2003/005* (2013.04)

(58) Field of Classification Search
CPC .......................... B60C 25/02; B60C 2003/005
See application file for complete search history.

(56) References Cited

U.S. PATENT DOCUMENTS

| 6,588,479 | B1 * | 7/2003 | Kliskey | ........... B60C 25/02 157/1.1 |
| 6,712,114 | B2 * | 3/2004 | Kliskey | ........... B60C 25/02 157/1.1 |
| 7,156,141 | B1 * | 1/2007 | Kliskey | ........... B60C 25/02 157/1 |
| 9,434,220 | B2 * | 9/2016 | Kliskey | ........... B60C 25/02 157/1.3 |

* cited by examiner

*Primary Examiner* — David B Thomas
(74) *Attorney, Agent, or Firm* — Maginot Moore & Beck LLP

(57) ABSTRACT

A tire removal tool for removing a tire from a dual wheel assembly has a handle having a gripping portion configured to be manually gripped, a head configured for introduction into the space between the wheels, and an intermediate portion connected between the handle and the head. The intermediate portion has a bent configuration so that the tool can extend over the outermost wheel with the head in contact with the inside of the wheel and the handle manually accessible at the outside of the wheel. The head includes an engagement surface arranged to simultaneously contact the sidewall of the innermost wheel to act as a fulcrum for transmitting an upward force applied to the handle to a force at the distal end of the head sufficient to dislodge the tire bead from the rim.

20 Claims, 5 Drawing Sheets

TIRE REMOVAL TOOL

REFERENCE TO RELATED APPLICATION AND PRIORITY CLAIM

This application is a utility filing from and claims priority to pending Provisional Application No. 61/944,803, filed on Feb. 26, 2014, the entire disclosure of which is incorporated herein by reference.

BACKGROUND

The present disclosure relates generally to tire removal tools, and more particularly to tire removal tools for removing an outside dual wheel on a truck.

Large vehicles, such as semi-trailer trucks and heavy load haulers usually have multiple sets of dual wheels to support the vehicle and load. Dual wheels are a pair of tire and wheel assemblies that are mounted immediately adjacent to one another on a single axle hub. These assemblies are able to bear greater loads than single wheels and also provide redundancy so that if one of the two tires fails, the second will continue to support the vehicle and load. This redundancy prevents loss of control of the vehicle and allows the vehicle to travel to a facility for repair. In dual wheel assemblies, the tires nearest to the body of the vehicle are referred to herein as the innermost wheels and the tires farthest from the body of the vehicle are referred to herein as the outermost wheels.

Each wheel of each dual wheel assembly includes a rim and a tire. As shown in FIG. 5, the rim 10 provides the structure and shape of the wheel, and the tire 14 covers the rim 10 to provide flexible, shock absorbing cushion to the wheel. The tires 14 used on modern vehicles are typically pneumatic tires made of a rubber material and including a tread 18 and a body 22. The tread 18 of the tire 14 provides traction for the tire 14 on the road surface and the body 22 of the tire 14 provides containment for compressed air. Portions of the body 22 of the tire 14 which contact the rim 10 are known as beads 26, and portions of the body 22 of the tire 14 between the beads 26 and the tread 18 are known as sidewalls 30. To ensure that beads 26 of the tire 14 fit tightly on the rims 10 of a wheel, beads 26 are typically made of high strength, low flexibility rubber and are typically reinforced with steel wire. This sturdy structure is intended to prevent the tire 14 from shifting or spinning on the rim 10 when the wheel rotates. If the beads 26 are not tight enough, friction between the traction of the tire 14 and the road will tend to prevent the tire 14 from rotating in unison with the rim 10.

When a tire on a large vehicle does need to be replaced, it is common to remove and replace just the tire, without removing the wheel rims. Replacing just the tires can be a faster and easier process due to the large size of the wheels and the difficulty of removing the wheels from the associated vehicle axles. However, because of the very tight fit between the beads and the rim, separating the beads from the rim is often the most difficult part of tire replacement. In particular, separating the inside bead, the bead that connects the tire to the rim on the side of the tire that is nearest to the body of the truck, is most difficult due to its inaccessible position. While some have attempted to separate the inside bead from the rim by driving wedges or forcing tire irons between the tire and the rim, these techniques are often ineffective and frequently cause damage to the tire and/or the rim. Accordingly, there is a need for a tool which can be used to easily separate the inside bead from the rim on a truck tire without damaging the tire or the rim.

SUMMARY

Embodiments of the present disclosure are directed to a tool which can be used to easily break the inside bead on a truck tire without damaging the tire or the rim. The tool includes a handle having a gripping portion and an engagement portion and a head coupled to the engagement portion of the handle. The head is configured to facilitate insertion of the tool between the tire and the rim and the handle is configured to apply leverage to separate the tire from the rim.

In one aspect, a tire removal tool for removing a tire from a dual wheel assembly has a handle having a gripping portion configured to be manually gripped, a head configured for introduction into the space between the wheels, and an intermediate portion connected between the handle and the head. The intermediate portion has a bent configuration so that the tool can extend over the outermost wheel with the head in contact with the inside of the wheel and the handle manually accessible at the outside of the wheel. The head includes an engagement surface arranged to simultaneously contact the sidewall of the innermost wheel to act as a fulcrum for transmitting an upward force applied to the handle to a force at the distal end of the head sufficient to dislodge the tire bead from the rim.

In another aspect, a method is provided for removing a tire from a dual wheel assembly having an outboard wheel and an inboard wheel adjacent the outboard tire and defining a space therebetween, each wheel including a tire mounted on a wheel rim, the tire including a bead and a sidewall facing the other wheel. The method comprises advancing a tool over the outboard wheel, the tool including a handle having a gripping portion configured to be manually gripped, a head configured for introduction into the space between the wheels, the head having a distal end configured to contact the inside of the tire of the outboard wheel and an engagement surface arranged to simultaneously contact the sidewall of the inboard wheel, and an intermediate portion connected between the handle and the head and configured to extend over the outboard wheel with the handle manually accessible at the outside of the outboard wheel. The tool is manipulated so that the distal end of the head contacts the tire of the outboard wheel and the engagement surface of the head contacts the sidewall of the tire on the inboard wheel.

In one aspect, an upward force is applied on the handle to rotate the tool about a fulcrum formed between the engagement surface and the sidewall of the tire on the inboard wheel. This upward force is translated through the fulcrum to the distal end of the head to apply force to the tire of the outboard wheel sufficient to dislodge the bead from the rim of the outboard wheel. Applying further upward force to the handle advances the head of the tool entirely between the tire bead and the rim of the outboard wheel, to dislodge the bead from the rim. The tool can then be manipulated to slide the head around the circumference of the rim to completely separate the tire bead from the wheel rim, thereby permitting removal of the tire.

DETAILED DESCRIPTION

Figure 1:
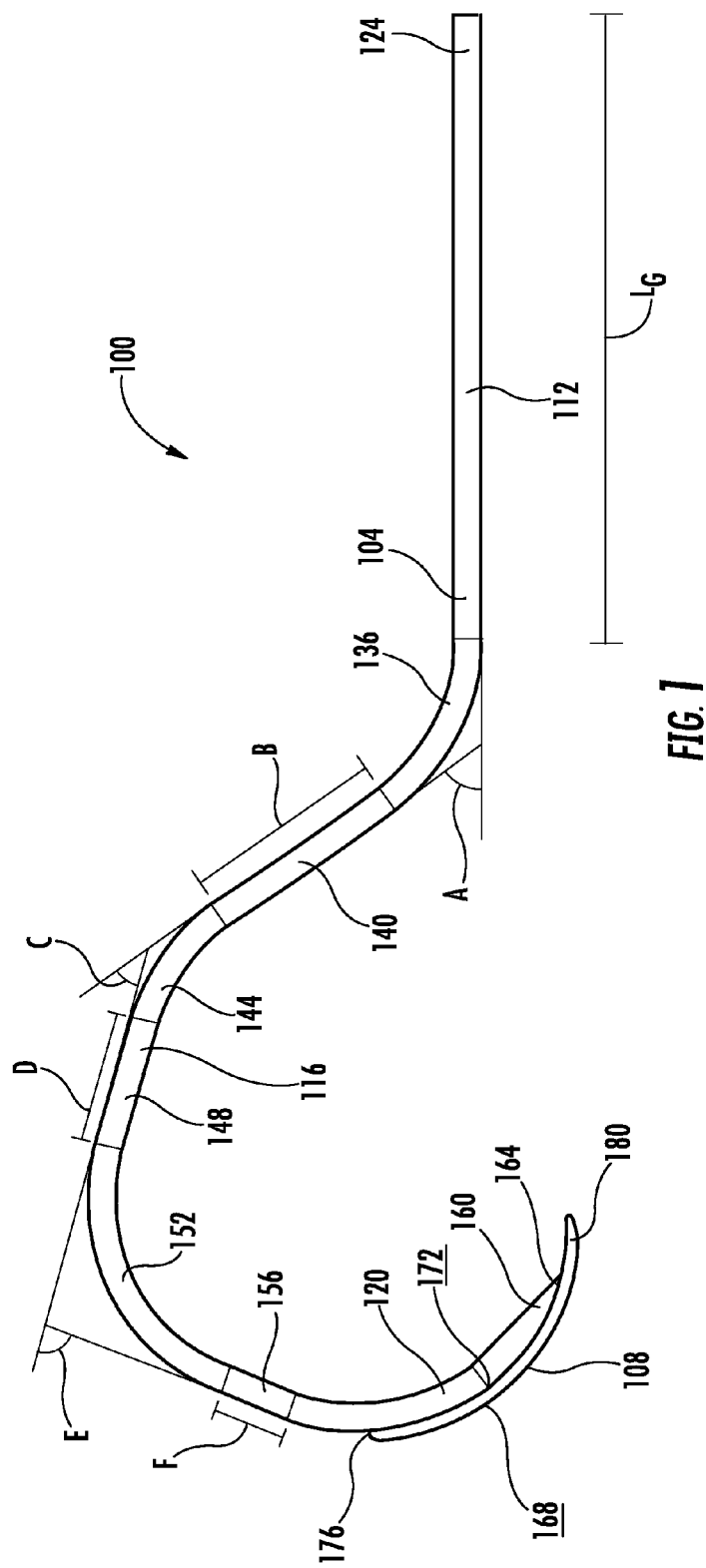
FIG. 1 is a side view of a tire removal tool.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 2:
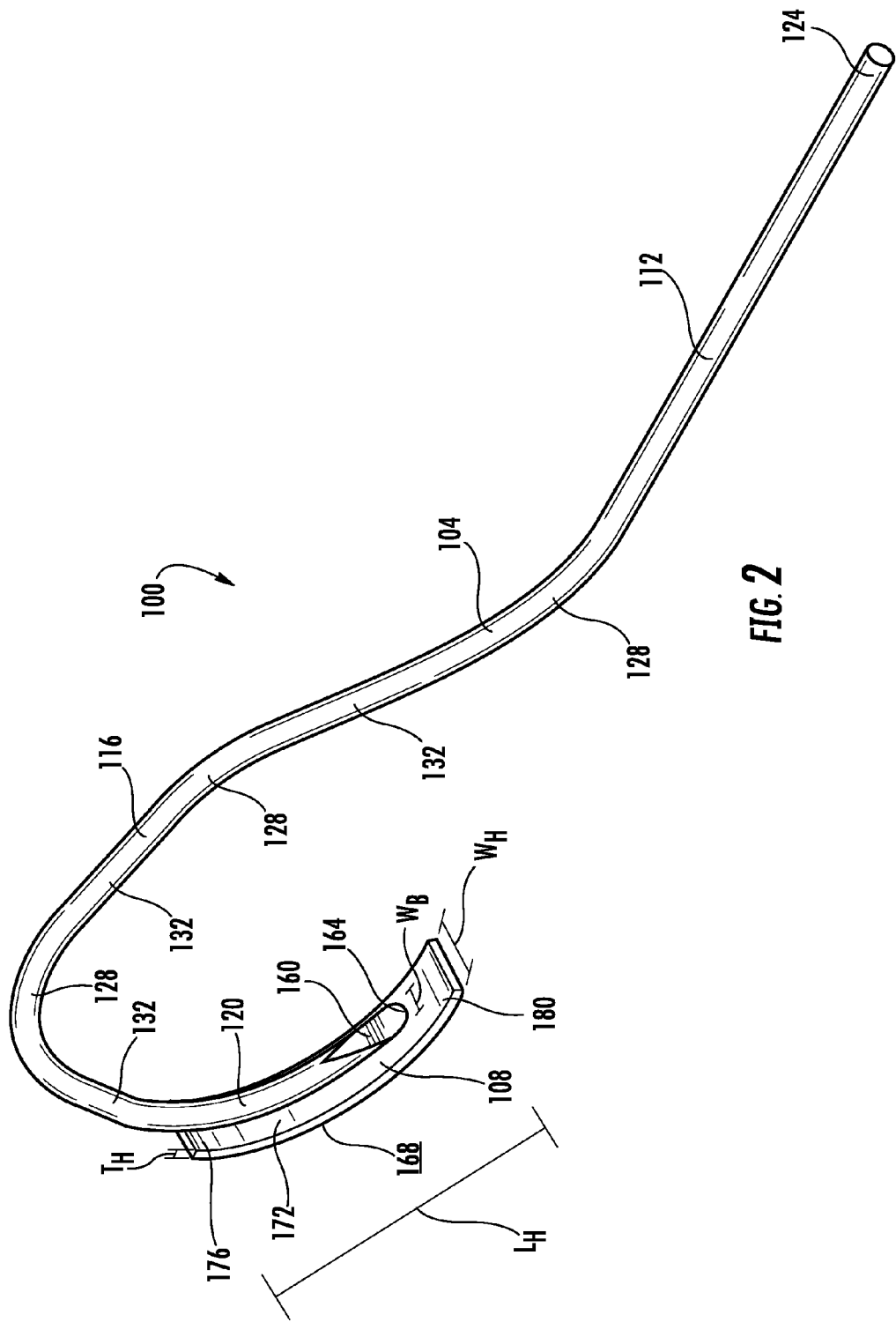
FIG. 2 is a top perspective view of the tire removal tool of FIG. 1.
Figure 3:
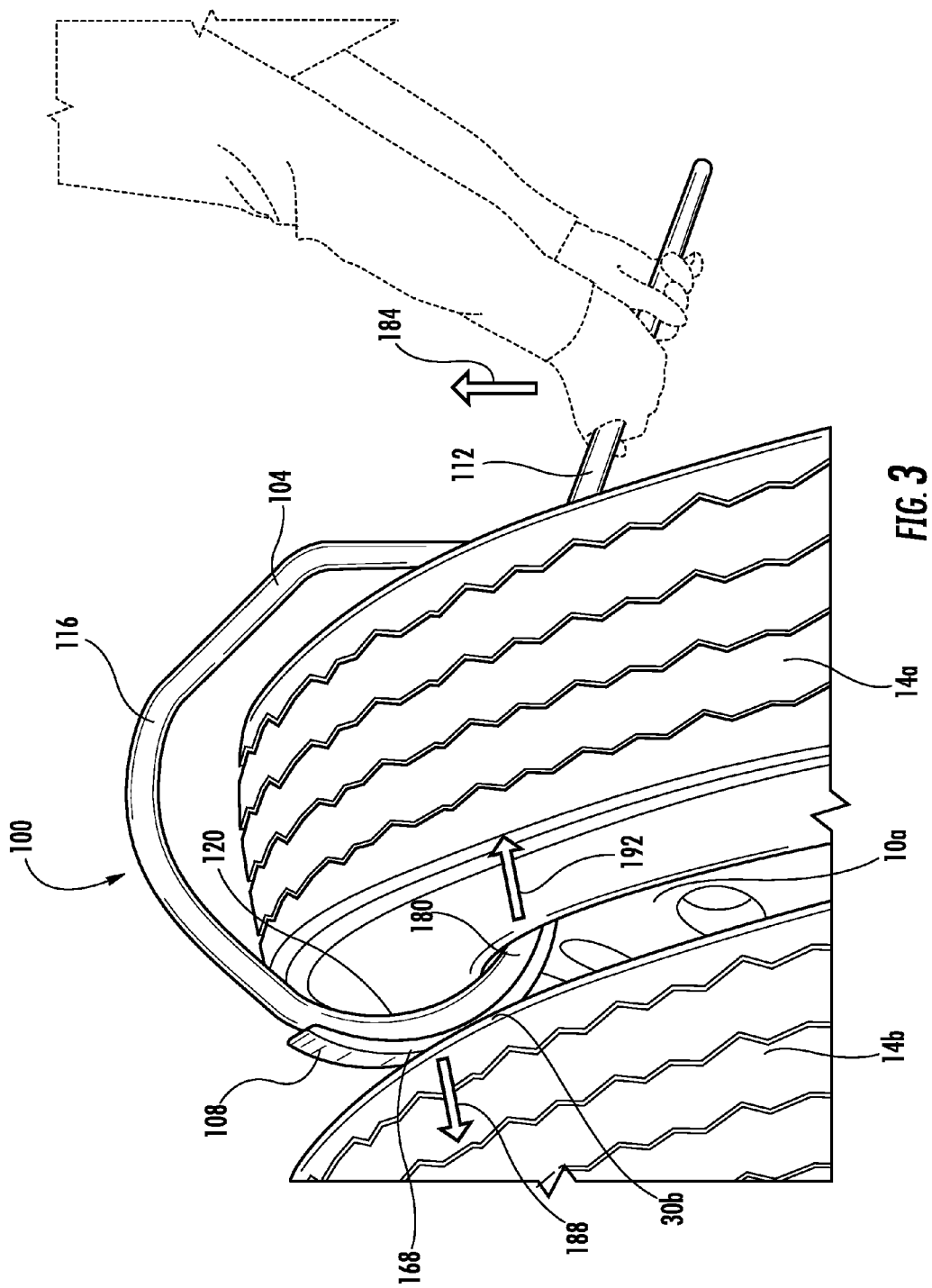
FIG. 3 is a perspective view of the tire removal tool of FIG. 1 in contact with tires of an associated dual wheel assembly.
Figure 4:
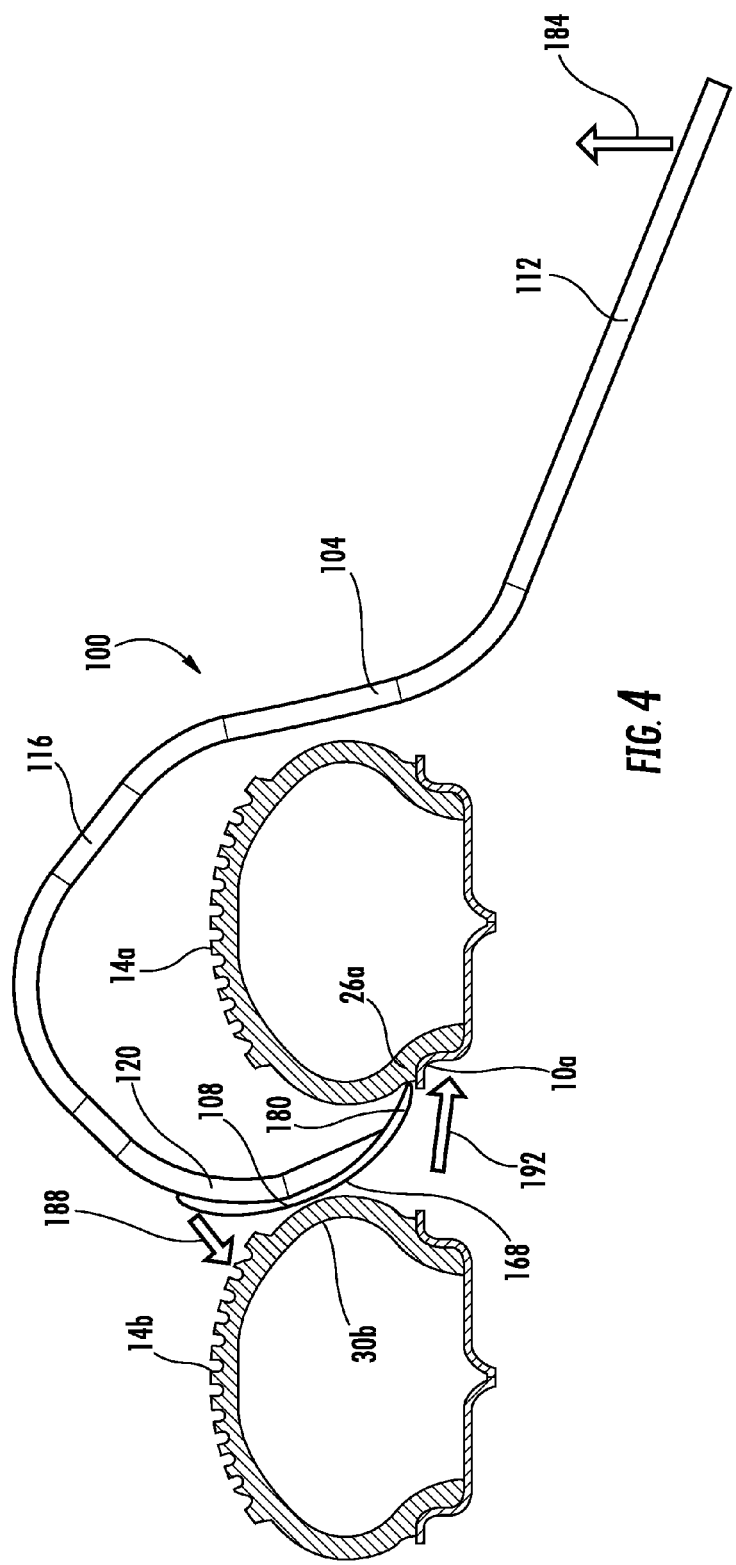
FIG. 4 is a depiction of the tire removal tool of FIG. 1 in contact with the tires of the associated dual wheel assembly of FIG. 3.
Figure 5:
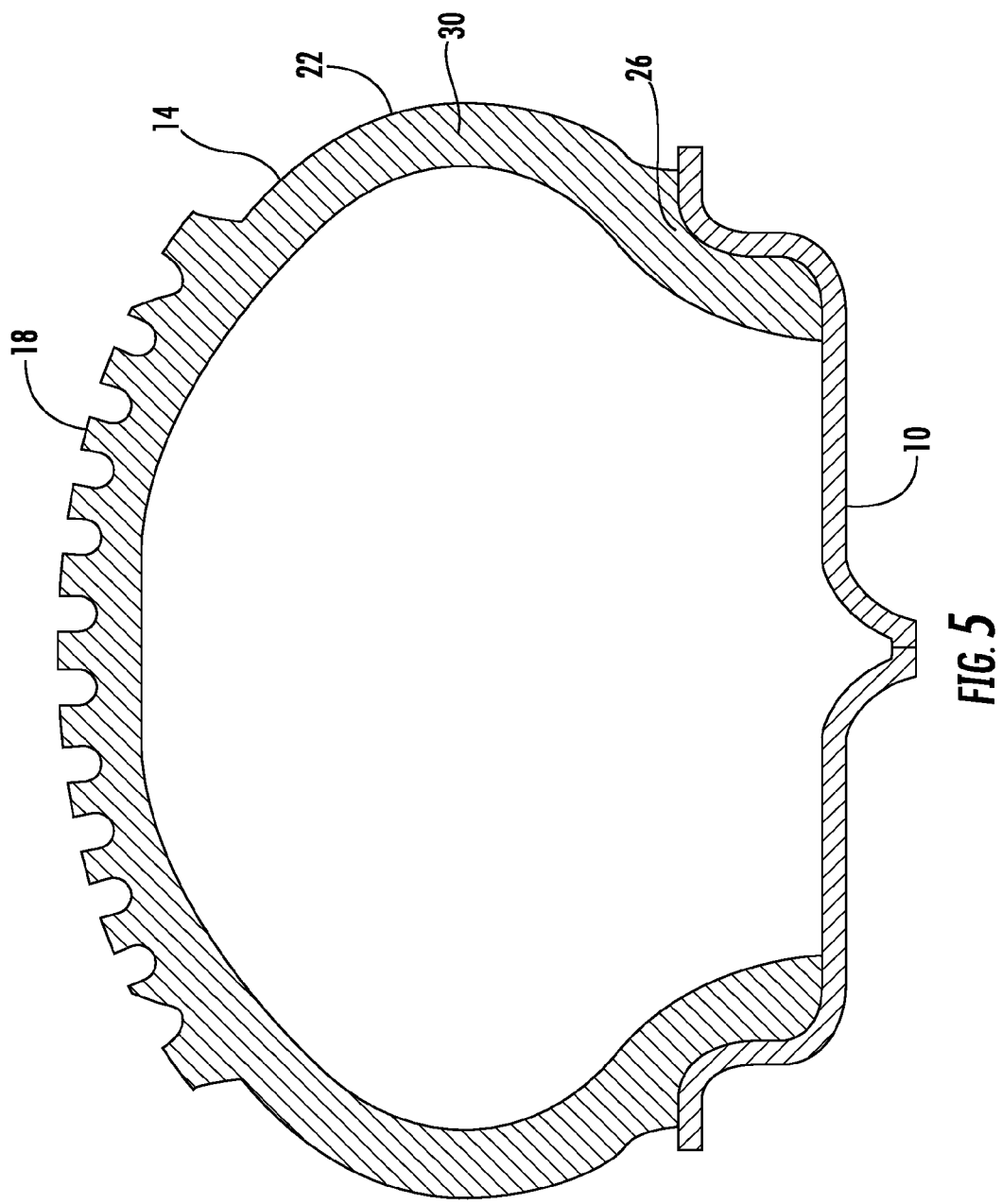
FIG. 5 is a cross sectional of a conventional tire and a rim.

The present disclosure is directed to a tool 100, shown in FIGS. 1-4, configured to easily separate an inside bead 26a of a tire 14a from a rim 10a of a wheel (shown in FIG. 4). An advantage of the configuration of the tool 100 of the present disclosure is that it fits over the tire 14a of the outermost wheel of a dual wheel assembly to enable access to the inside bead 26a of the outermost tire 14a. Another advantage of the tool 100 of the present disclosure is that it includes a head 108 having a portion configured to contact a sidewall 30b of a tire 14b on an innermost wheel of the dual wheel assembly and the bead 26a of the tire 14a of the outermost wheel of the dual wheel assembly. The head 108 has a width $W_H$ wide enough to prevent the tool 100 from twisting when force is applied to the tool 100. Additionally, the head 108 provides sufficient surface area in contact with the both tires to prevent the tool from puncturing or damaging the tires. Another advantage of the tool 100 of the present disclosure is that it includes a handle 104 which is long enough to provide sufficient leverage for separating the tire 14a from the rim 10a of the outermost wheel when force is applied to the tool 100.

The tool 100 can be formed of steel, iron or another metal having similar properties so that the tool 100 will not deform or break under applied load. The tool 100 can be formed by forging, casting, or by another process capable of forming a hard, durable material. In at least one embodiment, the tool 100 is comprised of at least two separate parts, the handle 104 and the head 108, which can be joined together by welding or by another process capable of forming a strong connection between two hard, durable pieces. In an alternative embodiment, the handle 104 and the head 108 can be formed as a single piece.

Turning to FIG. 1, the tool 100 includes a handle 104 and a head 108 fixedly coupled to the handle 104. The handle 104 includes a gripping portion 112, an intermediate portion 116, and an engagement portion 120. The gripping portion 112 is arranged opposite the engagement portion 120 with the intermediate portion 116 interposed therebetween. The head 108 is coupled to the engagement portion 120 and is configured to match a contour of the engagement portion 120 so that the head 108 extends from the handle 104 as a continuation of the shape of the engagement portion 120 of the handle 104.

The handle 104 is substantially cylindrically shaped, preferably having a constant cross-section, and is bent to form an irregular curve. The cross-section is sufficiently large to prevent deformation of the handle 104 when pressure or bending force is applied to the tool 100. Additionally, the cross-section is sized to enable a user to securely grasp and apply force to the gripping portion 112 of the handle 104. In at least one embodiment, the handle 104 can include a surface treatment such as ribbing or cross-hatching, or a foam grip, on the gripping portion 112 to further facilitate secure grasping by the user.

The gripping portion 112 of the handle 104 is substantially straight and extends a length $L_G$ from the intermediate portion 116 to a gripping end 124 of the handle 104. The length $L_G$ is sufficient to enable a user to apply sufficient leverage through the tool 100 to a tire to separate a bead 26a of the tire 14a from a rim 10a (shown in FIG. 4). In one embodiment, the length $L_G$ is in a range of eighteen to thirty six inches. In a preferred embodiment, the length $L_G$ is approximately twenty four inches.

As shown in FIG. 3, the intermediate portion 116 extends from the gripping portion 112 to the engagement portion 120 and is configured to allow placement of the head 108 in the space between the dual wheels and in contact with the inner side of a tire with the handle 104 accessible to the user on the outside of the dual wheel assembly. As shown in FIG. 2, the intermediate portion 116 thus includes a plurality of curved sections 128 spaced apart from one another by substantially straight sections 132. The curved sections 128 and straight sections 132 are sized and configured to enable the handle 104 to fit over the tire 14 (shown in FIG. 3) to provide access to the inside bead 26a of the tire 14a. In the present embodiment, the bent portion 116 includes three curved sections 128 and three straight sections 132. However, in other embodiments, the bent portion 116 can include more or fewer curved sections and/or straight sections configured to enable the handle 104 to fit over a tire. In the present embodiment, the bent portion 116 forms a curved shape which positions the gripping portion 112 of the handle 104 to extend outwardly relative to the rim 10 of the wheel when the tool 100 engages the inside bead 26a of the tire 14a (shown in FIG. 4). The bent shape is configured such that a user can lift the gripping portion 112 of the handle 104 upwardly to bring the gripping portion 112 into a position that is substantially perpendicular to the rim 10 of the wheel to apply leverage to the inside bead 26a of the tire 14a. In one aspect, the tool is bent in a manner to resemble a shepherd's crook. In one embodiment, the handle, intermediate portion and engagement portion are integral and may be formed from a single solid bar bent to the aforementioned configurations. The bar may have a diameter of one to two inches. The head 108 may be affixed to the engagement portion 120 in a suitable manner, such as by welding.

By way of example, in the embodiment shown in FIG. 1, the curved sections 128 include a first curve 136, a first straight section 140, a second curve 144, a second straight section 148, a third curve 152, and a third straight section 156. In this example, relative terms such as "upwardly" and "downwardly" refer to the orientation of the tool 100 as shown in FIG. 1. The first curve 136 is arranged nearest to the gripping portion 112 and bends the handle 104 upwardly at a first angle A that is non-perpendicular and non-co-linear with the first straight section 140, for example, approximately 80°, relative to the gripping portion 112. The first straight section 140 extends a first length B, for example, approximately ten inches, from the first curve 136 to the second curve 144. The second curve 144 is arranged between the first straight section 140 and the second straight section 148 and bends the handle 104 downwardly at a second angle C, for example, approximately 40°, relative to the first straight section 140. The second straight section 148 extends a second length D, for example, approximately six inches, from the second curve 144 to the third curve 152. The third curve 152 is arranged between the second straight section 148 and the third straight section 156 and bends the handle 104 downwardly at a third angle E, for example, approximately 90°, relative to the second straight section 148. The third straight section 156 extends a third length F, for example, approximately three inches, from the third curve 152 to the engagement portion 120.

In alternative embodiments, the angles and lengths can be different than those given in this example. The angles and lengths are sufficient to enable the handle 104 to fit over a tire 14 such that the gripping portion 112 of the handle 104 extends outwardly relative to the rim 10 when the tool 100 engages the inside bead 26a of the tire 14a, and such that a user can lift the gripping portion 112 of the handle 104 upwardly to bring the gripping portion 112 into a position that is substantially perpendicular to the rim 10 of the wheel to apply leverage to the inside bead 26a of the tire 14a. The angles and lengths may also be calibrated to keep the bent portion 116 in close proximity to the tire 14a when in use.

The engagement portion 120 of the handle 104 extends from the intermediate portion 116 to an engagement end 160. The engagement portion 120 is curved such that the engagement end 160 extends in a direction toward the gripping portion 112 of the handle 104, as shown in FIG. 1. In one embodiment, the engagement end 120 is curved toward the handle at a generally constant radius curvature. The engagement portion 120 may be beveled toward the engagement end 160 such that the cross-section of the engagement portion 120 forms a narrow band 164 at the engagement end 160. The engagement end 160 is offset from a distal end 180 of the head 108. The narrow band 164 is shaped to facilitate insertion between the tire and the rim and to provide clearance relative to the tire sidewall when the tool is manipulated. As shown in FIG. 2, the narrow band 164 has a width $W_B$ that is sufficient to distribute the force applied to the tire 14 and the rim 10 by leverage. Accordingly, the width $W_B$ of the narrow band 164 is configured to prevent the narrow band 164 from puncturing or damaging the tire 14 or the rim 10. For example, the width $W_B$ of the narrow band 164 can be two inches.

The head 108 is a substantially rectangularly shaped strip of material having a flat surface 168, a contact surface 172 opposite the flat surface 168, and a proximal end 176 opposite the distal end 180. The head 108 is coupled to the engagement portion 120 of the handle 104 such that the contact surface 172 is fixed to the handle 104 and the flat surface 168 faces away from the handle 104. The head 108 is coupled to the handle 104 such that the proximal end 176 is in contact with the engagement portion 120 and the distal end 180 extends beyond the engagement end 160. The head 108 is curved to match the curvature of the engagement portion 120 so that the head 108 extends from the handle 104 as a continuation of the shape of the engagement portion 120. Thus, the head 108 follows a generally constant radius curvature that allows the distal end 180 to engage the outer tire while the flat surface 168 contacts the sidewall of the inner tire. In one embodiment, the radius of curvature is about ten to fifteen inches. It is understood that the flat surface 168 follows the curvature of the head 108 but is flat across the width of the head and otherwise "flat" along the length in that the surface 168 does not include any gross surface features or curvatures. However, the flat surface 168 may be provided with surface features that facilitate sliding of the surface along a tire surface or sidewall 30.

As shown in FIG. 2, the head 108 has a thickness $T_H$, a width $W_H$, and a length $L_H$. The width $W_H$ of the head 108 is larger than the cross-section of the handle 104, and larger than the width $W_B$ of the narrow band 164, such that the head 108 is wider than, and extends on either side of, the engagement portion 120 of the handle 104. The width $W_H$ is preferably constant along the entire length $L_H$ of the head 108 and can be, for example, three inches. The length $L_H$ of the head 108 is sufficient to enable the head 108 to extend along the engagement portion 120 and beyond the engagement end 160. More particularly, the length is sufficient to engage the rim of the outer tire 14a bearing against the inner tire 14b, as depicted in FIG. 4. The length $L_H$ can be, for example, eight to twelve inches. The thickness $T_H$ of the head 108 is constant along a substantial portion of the length $L_H$ of the head 108 and is sufficient to prevent the head 108 from becoming deformed when force is applied to the head 108. The head 108 is tapered at both ends 176, 180 such that the thickness $T_H$ is thinnest at the ends 176, 180. The thinness at the proximal end 176 of the head 108 facilitates a smooth profile of the head 108 on the handle 104. The thinness at the distal end 180 facilitates insertion of the head 108 between the tire 14a and the rim 10a, and the taper enables the head 108 to be forced as a wedge between the tire 14a and the rim 10a. Additionally, because the engagement end 160 of the engagement portion 120 also includes a taper leading to the narrow band 164, the shape of the head 108 and the engagement portion 120 cooperate to facilitate forcing the engagement portion 120 of the handle 104 as a wedge between the tire 14 and the rim 10. The thickness $T_H$ may range from about ½ inches at the ends 176, 180 to about one inch along the majority of the length $L_H$.

Turning now to FIGS. 3 and 4, the tool 100 is shown in use with an associated dual wheel assembly. As shown, the tool 100 is configured such that, when the handle 104 is positioned over tire 14a of the outermost wheel, a portion of the head 108 is situated in the space between the two tires 14a, 14b so that the distal end 180 of the head 108 is brought into contact with the bead 26a and the rim 10a on the outermost wheel and the flat surface 168 of the head 108 is brought into contact with the sidewall 30b of the tire 14b on the innermost wheel. Additionally, when the handle 104 is positioned over the tire 14a, as shown in FIGS. 3 and 4, the gripping portion 112 of the handle 104 extends outwardly relative to the rim 10 of the outermost wheel to enable the user to grasp the gripping portion 112 and exert an upward force, as indicated by the arrow 184, on the gripping portion 112. Accordingly, the particular configuration of the handle 104 facilitates access to the inner bead 26 of the outermost wheel thereby enabling application of force thereto.

When applied to the gripping portion 112, the upward force 184 is translated through the bent portion 116 of the handle 104 and into the engagement portion 120 and the head 108. The translated force is thereby applied inwardly, as indicated by the arrow 188, through the flat surface 168 of the head 108 to the sidewall 30b of the tire 14b of the innermost wheel. The configuration of the flat surface 168 provides a sufficient surface area to prevent the tool 100 from damaging the innermost wheel. Additionally, the configuration of the flat surface 168 provides sufficient flat surface area to prevent the tool 100 from twisting or rotating relative to the tires 14.

As a result of the translated force, the sidewall 30b of the innermost wheel exerts a resistant force in an outwardly direction, substantially opposite to the translated force, as indicated by arrow 192. The resistant force is translated to the distal end 180 of the head 108. In other words, the tool 100 is operated as a lever having a fulcrum where the flat surface 168 of the head 108 contacts the sidewall 30b of the tire 14b of the innermost wheel. The resultant force applied by the tool 100 is thereby applied where the distal end 180 of the head 108 contacts the bead 26a and the rim 10a of the outermost wheel and acts to force the tool 100 as a wedge between the tire 14a and the rim 10a of the outermost wheel. As the tool is manipulated, or more particularly as more upward force 184 is applied to the handle, the flat surface 108 slides along the sidewall of the inner tire. The generally constant radius of curvature of the head 108 in contact with the sidewall enhances the mechanical advantage at the fulcrum between the flat surface 108 and the tire sidewall 30. The width $W_H$ of the head 108 and configuration of the distal end 180 of the head 108 provide a flat, wide contact surface to prevent damage to the rim 10a or tire 14a on the outermost wheel when force is applied by the tool 100. The upward force thus causes the head 108 of the tool to advance beneath the bead 26 until the beveled engagement end 160 contacts the bead. The bevel helps maneuver the tire bead away from the rim to allow the distal end of the tool to advance farther between the tire bead and the rim. Once the distal end 180 is positioned between the rim and the entire bead 26, further upward force 184 essentially lifts the bead up and away from the rim so the tire can be removed.

The tool can then be manipulated to slide the head around the circumference of the rim to completely separate the tire bead from the wheel rim, thereby permitting removal of the tire. Alternating force can be applied to the handle as the tool is manipulated so that the surface 168 maintains contact with the sidewall of the inboard tire and force in the direction 192 is maintained so that the head remains between the tire bead and rim.

While the tool 100 has been described above for use to separate the tire 14a from the rim 10a of the outermost wheel of a dual wheel assembly, it will be understood that the tool 100 can also be used to separate the tire 14b from the rim 10b on the innermost wheel of a dual wheel assembly or to separate a tire 14 from a rim 10 on a single wheel assembly. In such applications, the flat surface 168 of the head 108 is brought into contact with the vehicle instead of the sidewall 30b of the tire 14b of the innermost wheel.

The present disclosure should be considered as illustrative and not restrictive in character. It is understood that only certain embodiments have been presented and that all changes, modifications and further applications that come within the spirit of the disclosure are desired to be protected.

What is claimed is:

1. A tire removal tool for removing a tire from a dual wheel assembly having a first wheel and a second wheel adjacent the first wheel and defining a space therebetween, each wheel including a tire mounted on a wheel rim, each tire including beads in contact with the rim and sidewalls extending from the beads, the tool comprising:
    a handle having a gripping portion configured to be manually gripped;
    a head configured for introduction into the space between the wheels, said head having a distal end configured to contact the a bead of the tire of the first wheel and an engagement surface arranged to simultaneously contact a sidewall of the second wheel; and
    an intermediate portion connected between said handle and said head and configured to extend over the first wheel with said handle manually accessible at the outside of the first wheel.

2. The tire removal tool of claim 1, further comprising an elongated bar forming said handle and said intermediate portion.

3. The tire removal tool of claim 2, wherein said head is affixed to said elongated bar.

4. The tire removal tool of claim 3, wherein:
    said head includes a distal end for initially contacting the first tire; and
    said elongated bar includes a beveled end offset from said distal end of said head, said beveled end configured to engage the bead of the first tire when said distal end is advanced into the first tire.

5. The tire removal tool of claim 1, wherein said intermediate portion includes at least two bends from said handle to said head, said at least two bends configured to pass over the first tire.

6. The tire removal tool of claim 5, wherein a first one of said at least two bends closest to said handle is about forty (40) degrees.

7. The tire removal tool of claim 6, wherein a second one of said at least two bends closest to said head is about ninety (90) degrees.

8. The tire removal tool of claim 7, wherein said handle is connected to said intermediate portion at an angle of about 80 degrees relative to an axis of said handle.

9. The tire removal tool of claim 8, wherein said intermediate portion includes straight sections between said at least two bends.

10. The tire removal tool of claim 9, wherein said intermediate portion includes a first straight section between said handle and a first bend, a second straight section between said first bend and a second bend, and a third straight section between said second bend and said head.

11. The tire removal tool of claim 9, wherein:
    said first straight section has a length of about ten inches;
    said first bend is at about forty (40) degrees;
    said second straight section has a length of about six (6) inches;
    said second bend as at about ninety (90) degrees; and
    said third straight section has a length of about three (3) inches.

12. The tire removal tool of claim 1, wherein said handle is connected to said intermediate portion at a non-perpendicular and non-co-linear angle.

13. The tire removal tool of claim 12, wherein said handle is connected to said intermediate portion at an angle of about 80 degrees relative to an axis of said handle.

14. The tire removal tool of claim 1, wherein said engagement surface of said head is an elongated surface having a length of between about eight (8) and about twelve (12) inches.

15. The tire removal tool of claim 14, wherein said engagement surface of said head is curved toward the handle at a radius.

16. The tire removal tool of claim 1, wherein said head includes a distal end having a width adapted for applying force to the first tire, said width being about three (3) inches.

17. A tool for separating a tire bead from a wheel rim for a dual wheel assembly, the tool comprising:
    a head having a proximal end and a distal end, said distal end configured to engage the tire bead of the tire of an outboard wheel of the dual wheel assembly, said head further including a flat surface opposite adjacent said proximal end and configured to contact an outboard sidewall of the tire of an inboard wheel of the dual wheel assembly when said distal end is engaged with the tire bead of the tire of the outboard wheel; and an elongated handle coupled at one end to said head, and including a gripping portion at an opposite end thereof configured for manual grasping by a user and an intermediate portion extending between said gripping portion and said one end, the intermediate portion having a number of curved sections providing for the handle to bend away from and back toward the gripping portion and configured to be positioned over the outboard wheel when said head is in contact with the outboard sidewall of the tire of the inboard wheel with said gripping portion accessible outside the outboard wheel.

18. The tool for separating a tire bead from a wheel rim of claim 17, wherein said handle includes an elongated bar having a beveled end offset from said distal end of said head, said beveled end configured to engage the bead of the first tire when said distal end is advanced into the outboard tire.

19. The tool for separating a tire bead from a wheel rim of claim 17, wherein said intermediate portion includes at least two bends from said gripping portion to said head.

20. The tool for separating a tire bead from a wheel rim of claim 19, wherein said intermediate portion includes straight sections between said at least two bends and said gripping portion.

* * * * *